(12) United States Patent
Tomimoto et al.

(10) Patent No.: US 11,975,392 B2
(45) Date of Patent: May 7, 2024

(54) CUTTING TOOL AND METHOD FOR MANUFACTURING SAME

(71) Applicant: SUMITOMO ELECTRIC HARDMETAL CORP., Hyogo (JP)

(72) Inventors: Hideki Tomimoto, Hyogo (JP); Hirotsugu Iwasaki, Hyogo (JP); Satoru Kukino, Hyogo (JP); Takashi Harada, Hyogo (JP); Naoki Watanobe, Hyogo (JP); Mayuka Segawa, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 18/010,273

(22) PCT Filed: Dec. 22, 2020

(86) PCT No.: PCT/JP2020/047861
§ 371 (c)(1),
(2) Date: Dec. 14, 2022

(87) PCT Pub. No.: WO2022/137323
PCT Pub. Date: Jun. 30, 2022

(65) Prior Publication Data
US 2023/0191500 A1    Jun. 22, 2023

(51) Int. Cl.
*E21B 10/43* (2006.01)
*B23B 27/20* (2006.01)
(Continued)

(52) U.S. Cl.
CPC .............. *B23B 27/20* (2013.01); *B23P 15/28* (2013.01); *E21B 10/43* (2013.01); *E21B 10/567* (2013.01);
(Continued)

(58) Field of Classification Search
CPC ........ E21B 10/43; E21B 10/567; E21B 10/62; B23B 27/20; B23B 2222/28; B23B 2226/315
See application file for complete search history.

(56) References Cited

U.S. PATENT DOCUMENTS

2006/0234086 A1   10/2006  Sjorgren
2010/0202840 A1   8/2010   Ono et al.
(Continued)

FOREIGN PATENT DOCUMENTS

JP    H10-182231 A    7/1998
JP    H10-193203 A    7/1998
(Continued)

*Primary Examiner* — Cathleen R Hutchins
(74) *Attorney, Agent, or Firm* — Renner, Otto, Boisselle & Sklar, LLP

(57) ABSTRACT

A cutting tool includes: a base metal provided with a seat portion; a blade edge member that is a polycrystalline diamond sintered material containing polycrystalline diamond and a binder; and a brazing material that fixes the blade edge member to the seat portion of the base metal. The blade edge member has a thickness of greater than or equal to 0.3 mm. The brazing material is disposed between a blade edge bottom face of the blade edge member and a seat bottom face of the seat portion and is in contact with the blade edge bottom face and the seat bottom face. The flank face is located outside of the base metal with respect to the lateral face of the base metal.

17 Claims, 8 Drawing Sheets

(51) Int. Cl.
  *B23P 15/28*  (2006.01)
  *E21B 10/567*  (2006.01)
(52) U.S. Cl.
  CPC ..... *B23B 2222/28* (2013.01); *B23B 2226/315* (2013.01); *B23B 2265/32* (2013.01)

(56) References Cited

U.S. PATENT DOCUMENTS

| | | | |
|---|---|---|---|
| 2020/0009663 A1 | 1/2020 | Maeda |
| 2020/0030889 A1 | 1/2020 | Harada |

FOREIGN PATENT DOCUMENTS

| | | | |
|---|---|---|---|
| JP | 2000-326111 | A | 11/2000 |
| JP | 2004-291126 | A | 10/2004 |
| JP | 2005-088178 | A | 4/2005 |
| JP | 2006-255884 | A | 9/2006 |
| JP | 2012-218083 | A | 11/2012 |
| JP | 2017-202557 | A | 11/2017 |
| JP | 2020-040170 | A | 3/2020 |
| WO | 2009/031348 | A1 | 3/2009 |
| WO | 2018/109954 | A1 | 6/2018 |
| WO | 2018/179666 | A1 | 10/2018 |

CUTTING TOOL AND METHOD FOR MANUFACTURING SAME

TECHNICAL FIELD

The present disclosure relates to a cutting tool and a method for manufacturing the same.

BACKGROUND ART

PTL 1 (Japanese Patent Laying-Open No. 10-193203) discloses a throw away tip including a base metal formed with a recess and a cutting member brazed to the recess. The cutting member is a layered sintered material obtained by laminating a backing plate made of cemented carbide and an ultra-high hardness sintered material containing diamond or cubic boron nitride (CBN) as a main component. The cutting member is fixed to the recess of the base metal by brazing the backing plate to the recess of the base metal. The cutting member includes a rake face, a flank face, and a cutting edge formed on a ridge line where the rake face and the flank face meet. The flank face of the cutting member protrudes from a flank face of the base metal. The cutting edge is formed by grinding the flank face of the cutting member with a grindstone.

CITATION LIST

Patent Literature

PTL 1: Japanese Patent Laying-Open No. 10-193203

SUMMARY OF INVENTION

A cutting tool according to one aspect of the present disclosure includes: a base metal provided with a seat portion; a blade edge member that is a polycrystalline diamond sintered material containing polycrystalline diamond and a binder; and a brazing material that fixes the blade edge member to the seat portion of the base metal. The base metal includes a top face, a bottom face, and a lateral face that is contiguous to the top face and the bottom face. The seat portion includes a seat bottom face and a seat wall. The seat bottom face is set back from the top face toward the bottom face and is contiguous to the lateral face. The seat wall is contiguous to the top face, the seat bottom face, and the lateral face. The blade edge member includes: a rake face extending along the top face; a blade edge bottom face on a side opposite to the rake face; a flank face contiguous to the rake face and the blade edge bottom face; and a cutting edge formed between the rake face and the flank face. The blade edge member has a thickness of greater than or equal to 0.3 mm. The brazing material is disposed between the blade edge bottom face and the seat bottom face and is in contact with the blade edge bottom face and the seat bottom face. The flank face is located outside of the base metal with respect to the lateral face of the base metal.

A method for manufacturing the cutting tool according to one aspect of the present disclosure includes fixing a sintered blade edge material to the seat portion of the base metal with the brazing material. The sintered blade edge material is the polycrystalline diamond sintered material that contains the polycrystalline diamond and the binder, and includes the rake face, the blade edge bottom face, and the flank face. The method for manufacturing the cutting tool according to one aspect of the present disclosure includes forming the cutting edge by performing laser processing on the flank face of the sintered blade edge material with a laser beam applied along the flank face of the sintered blade edge material.

A method for manufacturing the cutting tool according to one aspect of the present disclosure includes fixing a sintered blade edge material to the seat portion of the base metal with the brazing material. The sintered blade edge material is the polycrystalline diamond sintered material that contains the polycrystalline diamond and the binder, and includes the rake face, the blade edge bottom face, and the flank face. The method for manufacturing the cutting tool according to one aspect of the present disclosure includes forming the cutting edge by performing laser processing on the flank face of the sintered blade edge material with a laser beam applied along the flank face of the sintered blade edge material under a first laser irradiation condition. The method for manufacturing the cutting tool according to one aspect of the present disclosure includes generating at least one of the graphite or the cobalt oxide on the flank face by performing laser processing on the flank face with the laser beam applied along the flank face under a second laser irradiation condition different from the first laser irradiation condition.

DETAILED DESCRIPTION

Figure 1:
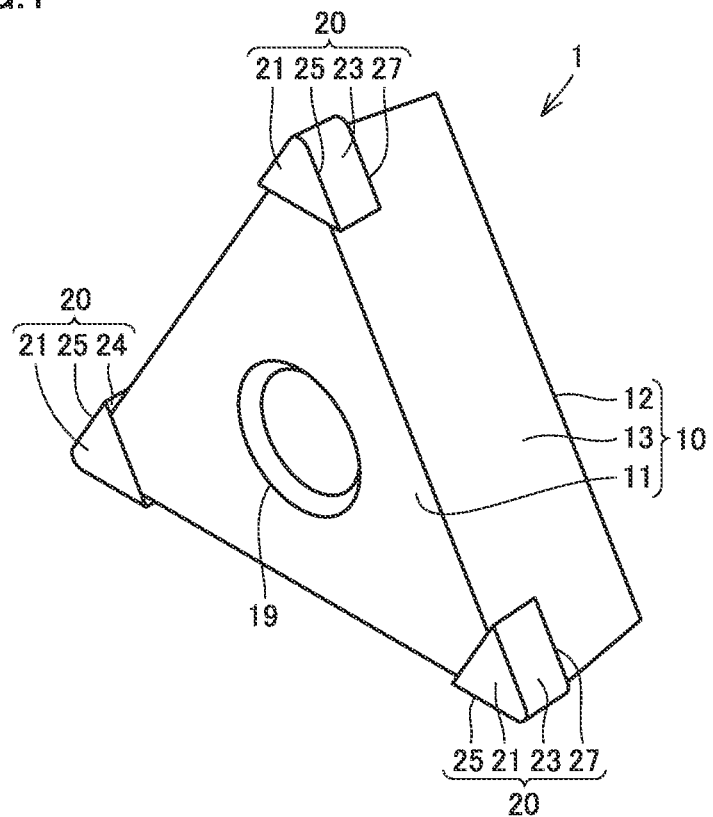
FIG. 1 is a schematic perspective view of a cutting tool according to an embodiment.
Figure 2:
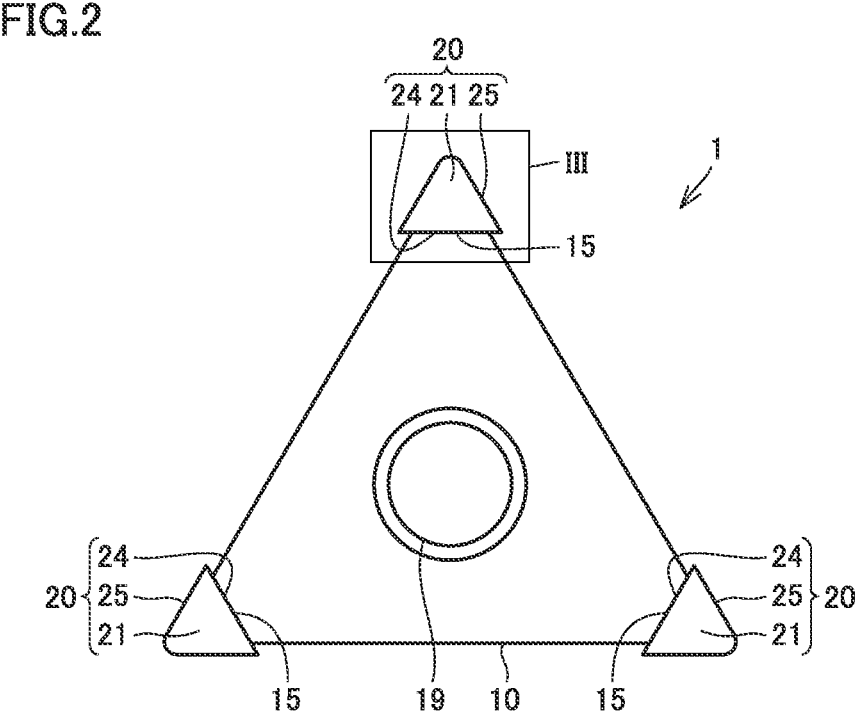
FIG. 2 is a schematic front view of the cutting tool according to the embodiment.
Figure 3:
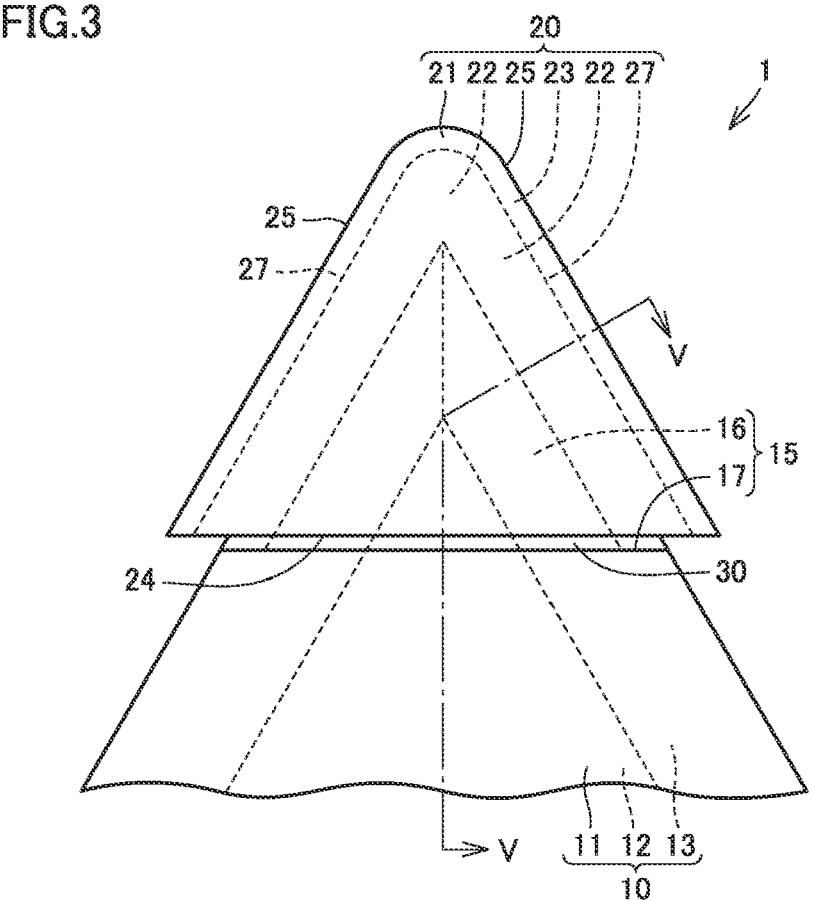
FIG. 3 is a partially enlarged front view schematically illustrating a region III in FIG. 2 of the cutting tool according to the embodiment.
Figure 4:
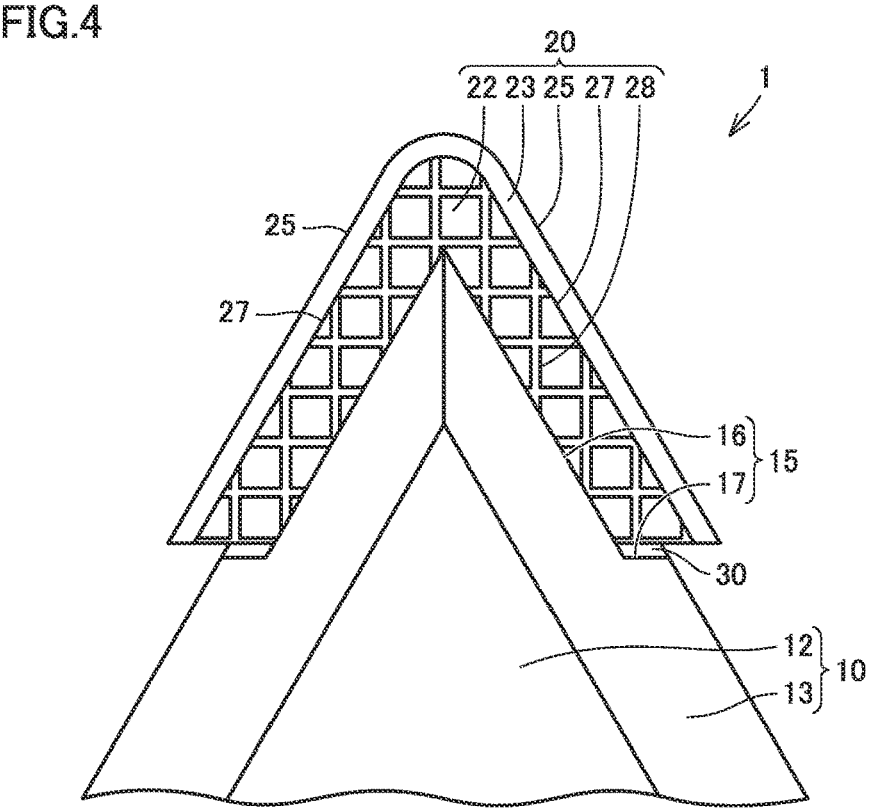
FIG. 4 is a partially enlarged rear view schematically illustrating the cutting tool according to the embodiment.

Problem to be Solved by the Present Disclosure

In the throw away tip disclosed in PTL 1, the cutting member includes an ultra-high hardness sintered material and a backing plate. In addition, the cutting edge is formed by grinding a flank face of the cutting member with a grindstone. Therefore, in order to form the cutting edge, it is necessary to grind not only the ultra-high hardness sintered material but also the backing plate on which the cutting edge is not formed. In addition, a grindstone is needed for manufacturing the throw away tip. As a result, the manufacturing time of the throw away tip becomes long, and the manufacturing cost of the throw away tip increases. An object of the present disclosure is to provide a cutting tool capable of forming a cutting edge at lower cost without shortening the life of the cutting tool.

Advantageous Effect of the Present Disclosure

According to the cutting tool of the present disclosure, the cutting edge can be formed at lower cost without shortening the life of the cutting tool.

DESCRIPTION OF EMBODIMENTS

Embodiments of the present disclosure will be listed and described.

(1) A cutting tool 1 according to the present disclosure includes: a base metal 10 provided with a seat portion 15; a blade edge member 20 that is a polycrystalline diamond sintered material containing polycrystalline diamond and a binder; and a brazing material 30 that fixes blade edge member 20 to seat portion 15 of base metal 10. Base metal 10 includes a top face 11, a bottom face 12, and a lateral face 13 contiguous to top face 11 and bottom face 12. Seat portion 15 includes a seat bottom face 16 and a seat wall 17. Seat bottom face 16 is set back from top face 11 toward bottom face 12 and is contiguous to lateral face 13. Seat wall 17 is contiguous to top face 11, seat bottom face 16, and lateral face 13. Blade edge member 20 includes: a rake face 21 extending along top face 11; a blade edge bottom face 22 on the side opposite to rake face 21; a flank face 23 contiguous to rake face 21 and blade edge bottom face 22; and a cutting edge 25 formed between rake face 21 and flank face 23. Blade edge member 20 has a thickness h that is greater than or equal to 0.3 mm. Brazing material 30 is disposed between blade edge bottom face 22 and seat bottom face 16, and is in contact with blade edge bottom face 22 and seat bottom face 16. Flank face 23 is located outside of base metal 10 with respect to lateral face 13 of base metal 10.

In cutting tool 1 according to the present disclosure, blade edge member 20 is a polycrystalline diamond sintered material containing polycrystalline diamond and a binder, and brazing material 30 is disposed between blade edge bottom face 22 and seat bottom face 16 and is in contact with blade edge bottom face 22 and seat bottom face 16. That is, blade edge member 20 does not include a backing plate. In addition, flank face 23 is located outside of base metal 10 with respect to lateral face 13 of base metal 10. Therefore, cutting edge 25 can be formed in a shorter time by performing laser processing on flank face 23 without a grindstone. Cutting edge 25 can be formed at lower cost.

Cutting edge 25 can be formed without performing laser processing on the backing plate. Therefore, melting of brazing material 30 due to laser processing of the backing plate can be prevented. Further, since thickness h of blade edge member 20 is greater than or equal to 0.3 mm, the distance between cutting edge 25 and brazing material 30 increases. It is possible to prevent brazing material 30 from melting due to heat generated in cutting edge 25 when a workpiece is cut using cutting tool 1. Thus, the life of cutting tool 1 can be prevented from being shortened.

In addition, the polycrystalline diamond sintered material contains a binder. The binder makes it possible to sinter polycrystalline diamond at low cost. Therefore, the cost of cutting tool 1 can be decreased. The binder improves the wear resistance of blade edge member 20. Therefore, the wear resistance of cutting tool 1 can be improved. The binder increases an absorption rate of the polycrystalline diamond sintered material with respect to a laser beam 36 during laser processing. Therefore, cutting edge 25 can be easily formed by laser processing.

(2) In cutting tool 1 according to (1) above, a first extension face 23b of flank face 23 extending from blade edge bottom face 22 toward bottom face 12 of base metal 10 is separated from lateral face 13 of base metal 10.

Therefore, laser beam 36 for forming cutting edge 25 is applied to flank face 23 without being applied to base metal 10. Cutting edge 25 can be formed at lower cost.

(3) In cutting tool 1 according to (1) or (2) above, at least one of blade edge bottom face 22 or seat bottom face 16 has a recessed structure 28. At least a part of recessed structure 28 is filled with brazing material 30.

With this configuration, fixing strength of blade edge member 20 with respect to base metal 10 increases. The life of cutting tool 1 is increased.

(4) In cutting tool 1 according to any one of (1) to (3) above, a protrusion length t of flank face 23 from lateral face 13 is greater than or equal to 0.01 mm.

Therefore, irradiation of base metal 10 with laser beam 36 for forming cutting edge 25 can be easily avoided. Cutting edge 25 can be formed at lower cost.

(5) In cutting tool 1 according to (4) above, protrusion length t of flank face 23 is less than or equal to 0.50 mm.

Therefore, reduction in rigidity of blade edge member 20 is suppressed. It is possible to prevent an occurrence of a chip in cutting edge 25 when a workpiece is cut using cutting tool 1. It is possible to prevent sudden damage of cutting tool 1 when a workpiece is cut using cutting tool 1. The life of cutting tool 1 can be prevented from being shortened.

(6) In cutting tool 1 according to any one of (1) to (5) above, thickness h of blade edge member 20 is less than or equal to 2.0 mm.

Therefore, a used amount of the polycrystalline diamond sintered material constituting blade edge member 20 can be reduced. The cost of cutting tool 1 can be decreased.

(7) In cutting tool 1 according to any one of (1) to (6) above, the polycrystalline diamond sintered material contains at least one of graphite or cobalt oxide on flank face 23.

Graphite has lubricity. Therefore, when flank face 23 contains graphite, cutting tool 1 has excellent lubricity capable of addressing initial wear. The wear resistance of cutting tool 1 can be improved. Cobalt oxide improves the wear resistance of flank face 23. Therefore, when flank face 23 contains cobalt oxide, the wear resistance of cutting tool 1 can be improved.

(8) In cutting tool 1 according to (7) above, when Raman spectroscopy is performed on flank face 23 with carbon constituting the polycrystalline diamond being defined as first carbon and carbon constituting the graphite being defined as second carbon, a ratio of a second peak intensity of the second carbon on flank face 23 to a sum of a first peak intensity of the first carbon on flank face 23 and the second peak intensity is greater than or equal to 0.01 and less than or equal to 0.50. The polycrystalline diamond has a volume average diameter of greater than or equal to 10 μm.

The ratio of graphite having lubricity is greater than or equal to 0.01. Therefore, cutting tool 1 has excellent lubricity capable of addressing initial wear. The wear resistance of cutting tool 1 can be improved. Since the ratio of graphite on flank face 23 is less than or equal to 0.50, the proportion of polycrystalline diamond having higher hardness than graphite on flank face 23 is greater than or equal to the proportion of graphite. Therefore, it is possible to prevent an excessive decrease in hardness of flank face 23. Since the volume average diameter of the polycrystalline diamond is greater than or equal to 10 μm, excessive conversion of the polycrystalline diamond into graphite during laser processing of flank face 23 can be prevented. Therefore, it is possible to prevent an excessive decrease in hardness of flank face 23. Thus, the wear resistance of cutting tool 1 can be improved.

(9) In cutting tool 1 according to (7) or (8) above, the polycrystalline diamond sintered material contains the cobalt oxide in an amount greater than or equal to 25 wt % on flank face 23.

Therefore, the wear resistance of flank face 23 can be further improved. The wear resistance of cutting tool 1 can be further improved.

(10) A method for manufacturing cutting tool 1 according to any one of (1) to (9) of a first aspect of the present disclosure includes a step (S2) for fixing a sintered blade edge material 20p to seat portion 15 of base metal 10 with brazing material 30. Sintered blade edge material 20p is a polycrystalline diamond sintered material containing polycrystalline diamond and a binder, and has rake face 21, blade edge bottom face 22, and flank face 23. The method for manufacturing cutting tool 1 according to the present disclosure includes a step (S4) for forming cutting edge 25 by performing laser processing on flank face 23 of sintered blade edge material 20p with laser beam 36 applied along flank face 23 of sintered blade edge material 20p.

Sintered blade edge material 20p is a polycrystalline diamond sintered material, and brazing material 30 is disposed between blade edge bottom face 22 and seat bottom face 16, and is in contact with blade edge bottom face 22 and seat bottom face 16. That is, sintered blade edge material 20p does not include a backing plate. In addition, flank face 23 is located outside of base metal 10 with respect to lateral face 13 of base metal 10. Therefore, cutting edge 25 can be formed in a shorter time by performing laser processing on flank face 23 without a grindstone. Cutting edge 25 can be formed at lower cost.

Cutting edge 25 can be formed without performing laser processing on the backing plate. Therefore, melting of brazing material 30 due to laser processing of the backing plate can be prevented. Further, since thickness h of blade edge member 20 is greater than or equal to 0.3 mm, the distance between cutting edge 25 and brazing material 30 increases. It is possible to prevent brazing material 30 from melting due to heat generated in cutting edge 25 when a workpiece is cut using cutting tool 1. Thus, the life of cutting tool 1 can be prevented from being shortened.

In addition, the polycrystalline diamond sintered material contains a binder. The binder makes it possible to sinter polycrystalline diamond at low cost. The cost of cutting tool 1 can be decreased. The binder improves the wear resistance of blade edge member 20. Therefore, the wear resistance of cutting tool 1 can be improved. The binder increases an absorption rate of the polycrystalline diamond sintered material with respect to laser beam 36 when cutting edge 25 is formed by laser processing. Therefore, cutting edge 25 can be easily formed by laser processing.

(11) A method for manufacturing cutting tool 1 according to any one of (7) to (9) of a second aspect of the present disclosure includes a step (S2) for fixing sintered blade edge material 20p to seat portion 15 of base metal 10 with brazing material 30. Sintered blade edge material 20p is a polycrystalline diamond sintered material containing polycrystalline diamond and a binder, and has rake face 21, blade edge bottom face 22, and flank face 23. The method for manufacturing cutting tool 1 according to the present disclosure includes a step (S4) for forming cutting edge 25 by performing laser processing on flank face 23 of sintered blade edge material 20p with laser beam 36 applied along flank face 23 of sintered blade edge material 20p under a first laser irradiation condition. The method for manufacturing cutting tool 1 according to the present disclosure includes a step (S5) for generating at least one of graphite or cobalt oxide on flank face 23 by performing laser processing on flank face 23 with laser beam 36 applied along flank face 23 under a second laser irradiation condition different from the first laser irradiation condition.

The method for manufacturing cutting tool 1 according to the second aspect of the present disclosure has the following effects in addition to the effects of the method for manufacturing cutting tool 1 according to the first aspect of the present disclosure described in (10) above. Graphite has lubricity. Therefore, when graphite is generated on flank face 23, cutting tool 1 has excellent lubricity capable of addressing initial wear. The wear resistance of cutting tool 1 can be improved. Cobalt oxide improves the wear resistance of flank face 23. Therefore, when cobalt oxide is generated on flank face 23, the wear resistance of cutting tool 1 can be improved.

In addition, the polycrystalline diamond sintered material contains a binder. The binder increases an absorption rate of the polycrystalline diamond sintered material with respect to laser beam 36 during generation of at least one of graphite or cobalt oxide by laser processing. Therefore, more of at least one of graphite or cobalt oxide can be generated on flank face 23 by laser processing under the second laser irradiation condition.

DETAILED DESCRIPTION OF EMBODIMENTS

The details of the embodiment will be described below with reference to the drawings. The same or corresponding parts in the drawings are denoted by the same reference signs, and the description thereof will not be repeated.

Referring to FIGS. 1 to 6, cutting tool 1 according to the present embodiment will be described.

Cutting tool 1 includes base metal 10, blade edge member 20, and brazing material 30.

Figure 5:
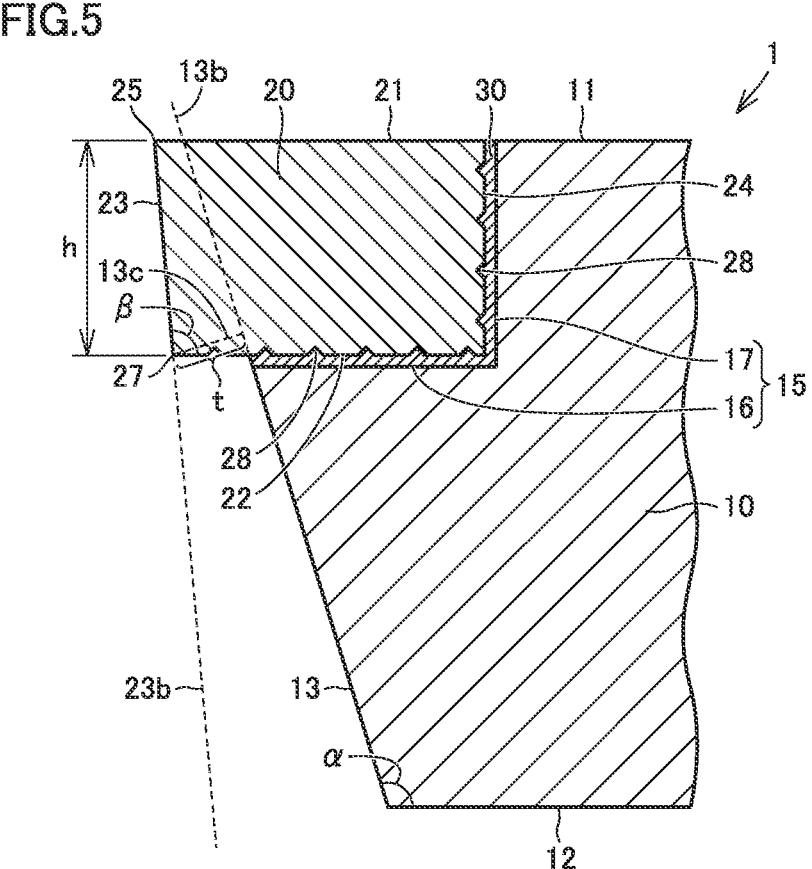
FIG. 5 is a partially enlarged cross-sectional view schematically illustrating the cutting tool according to the embodiment taken along a sectional line V-V in FIG. 3.
Figure 6:
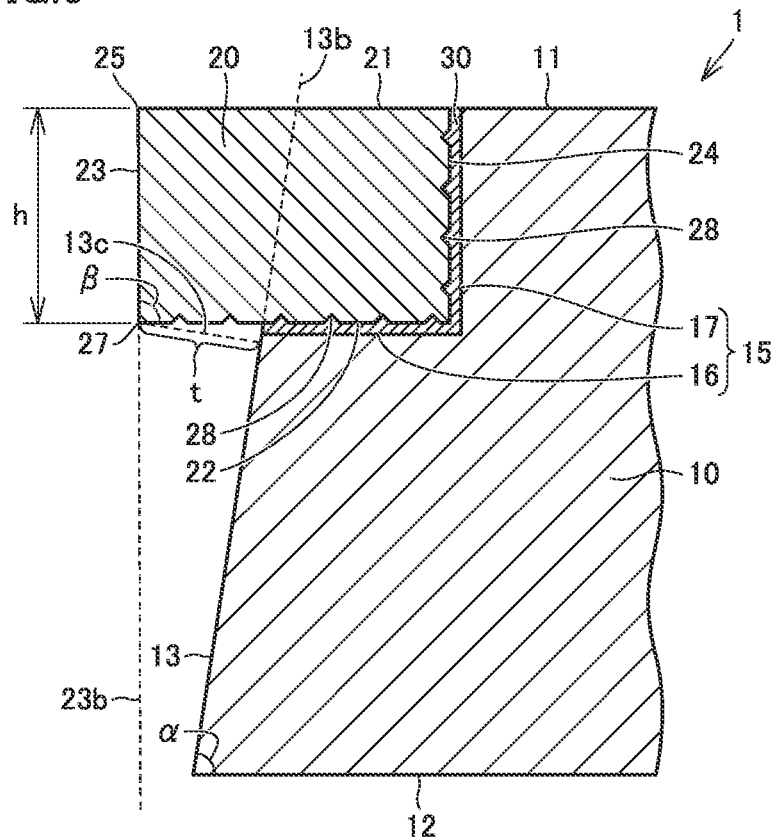
FIG. 6 is a partially enlarged cross-sectional view schematically illustrating a cutting tool according to another aspect of the embodiment.

Base metal 10 is made of, for example, cemented carbide. Base metal 10 is obtained, for example, by mixing and sintering cemented carbide powder such as tungsten carbide (WC) powder and binder powder such as cobalt powder. Base metal 10 includes top face 11, bottom face 12, and lateral face 13 contiguous to top face 11 and bottom face 12. As shown in FIGS. 1 to 5, an angle α of lateral face 13 with respect to bottom face 12 may be greater than 90°, and lateral face 13 may be a positive lateral surface. As shown in FIG. 6, angle α of lateral face 13 with respect to bottom face 12 may be less than or equal to 90°, and lateral face 13 may be a negative lateral surface.

The shape of base metal 10 in plan view from top face 11 of base metal 10 is, for example, an equilateral triangle. The shape of base metal 10 in plan view from top face 11 of base metal 10 is not particularly limited, and may be a polygon such as a rhombus, a regular pentagon, or a regular hexagon. Base metal 10 may be provided with a through hole 19 extending from top face 11 to bottom face 12. In order to hold base metal 10 with a holder, a locking member (not illustrated) of the holder (not illustrated) for fixing cutting tool 1 is locked to through hole 19 when cutting tool 1 is used for cutting.

Base metal 10 is provided with seat portion 15. Seat portion 15 includes seat bottom face 16 and seat wall 17. Seat bottom face 16 is set back from top face 11 toward bottom face 12 and is contiguous to lateral face 13. Seat wall 17 is contiguous to top face 11, seat bottom face 16, and lateral face 13. Seat portion 15 is provided on, for example, at least one of a plurality of corners of base metal 10. For example, seat portion 15 may be provided at two or more of the plurality of corners of base metal 10, or may be provided at all of the plurality of corners of base metal 10.

Blade edge member 20 is a polycrystalline diamond (PCD) sintered material containing polycrystalline diamond and a binder. The binder contains, for example, cobalt. The binder makes it possible to sinter polycrystalline diamond at low cost. Therefore, the cost of cutting tool 1 can be decreased. The binder improves the wear resistance of blade edge member 20. Therefore, the wear resistance of cutting tool 1 can be improved. The PCD sintered material is obtained by, for example, mixing and sintering diamond crystal powder and binder powder containing cobalt powder. Blade edge member 20 does not include a backing plate.

The volume average diameter of the polycrystalline diamond is, for example, greater than or equal to 10 μm. The volume average diameter of the polycrystalline diamond is obtained as follows.

Flank face 23 is polished to expose a face 100 μm away from flank face 23. This exposed face is parallel to flank face 23. On this exposed face, graphite and cobalt oxide described later are not generated. Reflected electron images of a plurality of fields (for example, five or more fields) of the exposed face are obtained using a scanning electron microscope (SEM). Black regions in the reflected electron images are regions where polycrystalline diamond particles are present. The black regions correspond to the polycrystalline diamond particles, respectively. White regions or gray regions in the reflected electron images are regions where the binder is present. The equivalent circle diameter of each black region in the reflected electron image of each of the plurality of fields is calculated using image analysis software. The equivalent circle diameter means a diameter of a circle having the same area as the area of each of the black regions. The volume of each black region is calculated assuming that each black region has a volume of a sphere having the equivalent circle diameter as a diameter. For each of the plurality of fields, the volume average diameter is calculated from the equivalent circle diameter and the volume of the black region. The average value of the volume average diameters of the plurality of fields is calculated as the volume average diameter of the polycrystalline diamond.

Blade edge member 20 includes rake face 21, blade edge bottom face 22 opposite to rake face 21, flank face 23 contiguous to rake face 21 and blade edge bottom face 22, and a blade edge lateral face 24.

Rake face 21 extends along top face 11. In the present specification, a configuration in which rake face 21 extends along top face 11 means that a main extending direction of rake face 21 is the same as a main extending direction of top face 11. Specifically, both the main extending direction of rake face 21 and the main extending direction of top face 11 are directions into the page. The configuration in which rake face 21 extends along top face 11 includes both a configuration in which rake face 21 is flush with top face 11 and a configuration in which rake face 21 is not flush with top face 11. The configuration in which rake face 21 extends along top face 11 also includes both a configuration in which rake face 21 is parallel with top face 11 and a configuration in which rake face 21 is not parallel with top face 11.

As shown in FIGS. 1 to 5, an angle β of flank face 23 with respect to blade edge bottom face 22 may be larger than 90°, and flank face 23 may be a positive flank face 23. As shown in FIG. 6, angle β of flank face 23 with respect to blade edge bottom face 22 may be less than or equal to 90°, and flank face 23 may be a negative flank face 23. Blade edge lateral face 24 faces seat wall 17 and is contiguous to rake face 21 and blade edge bottom face 22. Blade edge lateral face 24 may be further contiguous to flank face 23.

Blade edge member 20 further includes cutting edge 25 formed between rake face 21 and flank face 23. Cutting edge 25 is not particularly limited, but is, for example, a ridge line defined by rake face 21 and flank face 23. Cutting edge 25 may be formed, for example, by chamfering the ridge line defined by rake face 21 and flank face 23.

Blade edge member 20 has a thickness h that is greater than or equal to 0.3 mm. Thickness h of blade edge member 20 is defined as the shortest distance between cutting edge 25 and blade edge bottom face 22 in the normal direction of blade edge bottom face 22. Since thickness h of blade edge member 20 is greater than or equal to 0.3 mm, the distance between cutting edge 25 and brazing material 30 increases. It is possible to prevent brazing material 30 from melting due to heat generated in cutting edge 25 when a workpiece is cut using cutting tool 1. The life of cutting tool 1 can be prevented from being shortened. Thickness h of blade edge member 20 may be greater than or equal to 0.4 mm, or greater than or equal to 0.5 mm. Thickness h of blade edge member 20 may be less than or equal to 2.0 mm. Therefore, a used amount of the polycrystalline diamond sintered material constituting blade edge member 20 can be reduced. The cost of cutting tool 1 can be decreased. Thickness h of blade edge member 20 may be less than or equal to 1.5 mm.

Flank face 23 is located outside of base metal 10 with respect to lateral face 13 of base metal 10. Therefore, cutting edge 25 is also located outside of base metal 10 with respect to lateral face 13 of base metal 10. Referring to FIGS. 5 and 6, first extension face 23b of flank face 23 extending from blade edge bottom face 22 toward bottom face 12 of base metal 10 is separated from lateral face 13 of base metal 10. Therefore, laser beam 36 (see FIGS. 8 and 11) for forming or recovering cutting edge 25 is applied to flank face 23 without being applied to base metal 10.

Referring to FIGS. 5 and 6, a protrusion length t of flank face 23 from lateral face 13 is greater than or equal to 0.01 mm. Protrusion length t of flank face 23 is defined as the shortest distance between a second extension face 13b of lateral face 13 toward top face 11 of base metal 10 from lateral face 13 or seat bottom face 16 and a ridge line 27 of blade edge member 20 defined by blade edge bottom face 22 and flank face 23. That is, protrusion length t of flank face 23 is defined as a length of a perpendicular 13c from ridge line 27 of blade edge member 20 to lateral face 13 or second extension face 13b of lateral face 13. Therefore, irradiation of base metal 10 with laser beam 36 (see FIGS. 8 and 11) for forming or recovering cutting edge 25 can be easily avoided. Protrusion length t of flank face 23 may be greater than or equal to 0.05 mm, or greater than or equal to 0.10 mm. Protrusion length t of flank face 23 may be less than or equal to 0.50 mm. Therefore, reduction in rigidity of blade edge member 20 is suppressed. It is possible to prevent an occurrence of a chip in cutting edge 25 when a workpiece is cut using cutting tool 1. It is possible to prevent sudden damage of cutting tool 1 when a workpiece is cut using cutting tool 1. The life of cutting tool 1 can be prevented from being shortened.

Recessed structure 28 is formed in blade edge bottom face 22. With this configuration, fixing strength of blade edge member 20 with respect to base metal 10 increases. Recessed structure 28 may be, for example, a linear groove extending along blade edge bottom face 22 or a dot-shaped groove. The depth of the groove is, for example, about 10 µm. Specifically, recessed structure 28 may have a plurality of linear grooves arranged in a lattice. The plurality of linear grooves is formed at a pitch of about 0.1 mm, for example. Note that recessed structure 28 may be formed on seat bottom face 16 of base metal 10 or may be formed on both blade edge bottom face 22 and seat bottom face 16.

Recessed structure 28 may be further formed on blade edge lateral face 24. With this configuration, fixing strength of blade edge member 20 with respect to base metal 10 increases. Recessed structure 28 may be, for example, a linear groove extending along blade edge lateral face 24 or a dot-shaped groove. Note that recessed structure 28 may be further formed on seat wall 17 of base metal 10 or may be further formed on both blade edge lateral face 24 and seat wall 17.

The polycrystalline diamond sintered material may contain at least one of graphite or cobalt oxide on flank face 23. In the present specification, at least one of graphite or cobalt oxide means graphite, cobalt oxide, or graphite and cobalt oxide. Blade edge member 20 may be, for example, a polycrystalline diamond (PCD) sintered material containing polycrystalline diamond, a binder, and graphite. Blade edge member 20 may be, for example, a PCD sintered material containing polycrystalline diamond, cobalt oxide, and a binder. Blade edge member 20 may be, for example, a PCD sintered material containing polycrystalline diamond, cobalt oxide, graphite, and a binder.

Graphite has lubricity. Therefore, when flank face 23 contains graphite, cutting tool 1 has excellent lubricity capable of addressing initial wear. The wear resistance of cutting tool 1 (flank face 23) can be improved.

The ratio of graphite on flank face 23 is, for example, greater than or equal to 0.01 and less than or equal to 0.50. Since the ratio of graphite having lubricity is greater than or equal to 0.01, cutting tool 1 having excellent lubricity capable of addressing initial wear can be provided. The ratio of graphite may be greater than or equal to 0.05 and less than 0.50, or may be greater than or equal to 0.10 and less than or equal to 0.48. Herein, the ratio of graphite on flank face 23 is defined as the ratio of graphite to the sum of PCD and graphite on flank face 23. The ratio of graphite on flank face 23 is obtained by the following method.

Raman spectroscopy is performed by irradiating flank face 23 with a laser beam having a wavelength of 532 nm as excitation light at room temperature. In the Raman spectroscopy, a phonon peak is obtained by analyzing the Raman spectrum using a spectrometer (product name: "LabRAM HR UV-VIS NIR" manufactured by HORIBA, Ltd.) having a wavenumber resolution of less than or equal to 0.25 cm$^{-1}$. The phonon peak is fitted with a composite function of a Lorentz function and a Gaussian function using a least-square method, by which a first peak intensity (Id) of first carbon constituting the polycrystalline diamond and a second peak intensity (Ig) of second carbon constituting the graphite are obtained. The first peak of the first carbon constituting the polycrystalline diamond appears, for example, around 1333 cm$^{-1}$. The second peak of the second carbon constituting graphite appears, for example, around 1400 to 1700 cm$^{-1}$.

Ig/(Ig+Id) is calculated from the measured Id and Ig. Id and Ig are measured at each of randomly selected five locations on the exposed face, and Ig/(Ig+Id) is calculated. The average value of Ig/(Ig+Id) at the five locations is calculated as the ratio of graphite on flank face 23.

Specifically, the polycrystalline diamond sintered material may contain graphite at a depth of 1 µm from flank face 23. Cutting tool 1 including blade edge member 20 which is a polycrystalline diamond sintered material is applied to machine a difficult-to-cut workpiece. Specifically, machining of a difficult-to-cut workpiece is called "mirror finishing" or the like, and it is often requested to finish the workpiece to have a very small surface roughness. In such cutting machining, when cutting tool 1 is used until the face located at the depth of 1 µm from flank face 23 is exposed, it is commonly determined that cutting tool 1 has reached the end of its life. Since blade edge member 20 is a polycrystalline diamond sintered material containing graphite up to a depth of 1 µm from flank face 23, the lubricity of graphite is maintained until it is determined that cutting tool 1 has reached the end of its life.

Cobalt oxide improves the wear resistance of flank face 23. Therefore, when flank face 23 contains cobalt oxide, the wear resistance of cutting tool 1 can be improved. The polycrystalline diamond sintered material may contain, for example, cobalt oxide in an amount greater than or equal to 25 wt % on flank face 23. Therefore, the wear resistance of cutting tool 1 can be improved. The polycrystalline diamond sintered material may contain cobalt oxide in an amount greater than or equal to 30 wt % or in an amount greater than or equal to 40 wt % on flank face 23. The polycrystalline diamond sintered material may contain, for example, cobalt oxide in an amount less than or equal to 60 wt % on flank face 23. This configuration can prevent an excessive decrease in hardness of flank face 23 due to the presence of excessive cobalt oxide on flank face 23. The wear resistance of cutting tool 1 can be improved.

Note that the weight ratio of the cobalt oxide on flank face 23 is obtained as follows. An X-ray diffraction (XRD) pattern of flank face 23 of blade edge member 20 which is a polycrystalline diamond sintered material is obtained. From the intensity ratio of the peak corresponding to the cobalt oxide in the XRD pattern, the weight ratio of the cobalt oxide on flank face 23 is calculated by the reference intensity ratio (RIR) method.

Blade edge member 20 is fixed to seat portion 15 of base metal 10 using brazing material 30. Specifically, brazing material 30 is disposed between blade edge bottom face 22 and seat bottom face 16, and is in contact with blade edge bottom face 22 and seat bottom face 16. Brazing material 30 may be further disposed between blade edge lateral face 24 and seat wall 17, and may contact blade edge lateral face 24 and seat wall 17. Brazing material 30 is, for example, an Ag—Cu—In—Ti-based brazing material. At least a part of recessed structure 28 is filled with brazing material 30. Recessed structure 28 may be entirely filled with brazing material 30.

Figure 7:
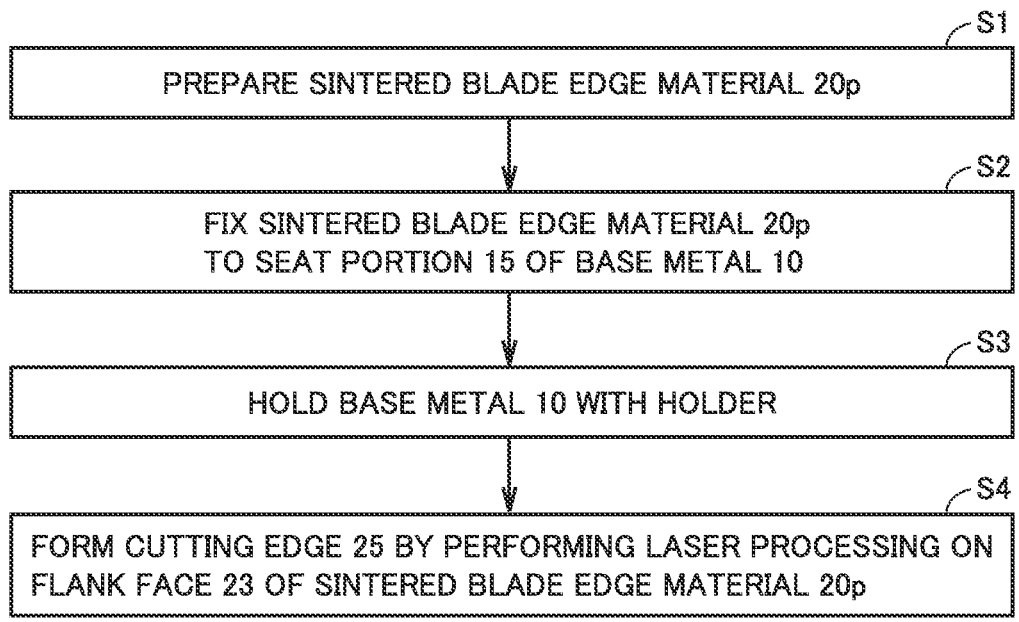
FIG. 7 is a flowchart illustrating an example of a method for manufacturing the cutting tool according to the embodiment.
Figure 8:
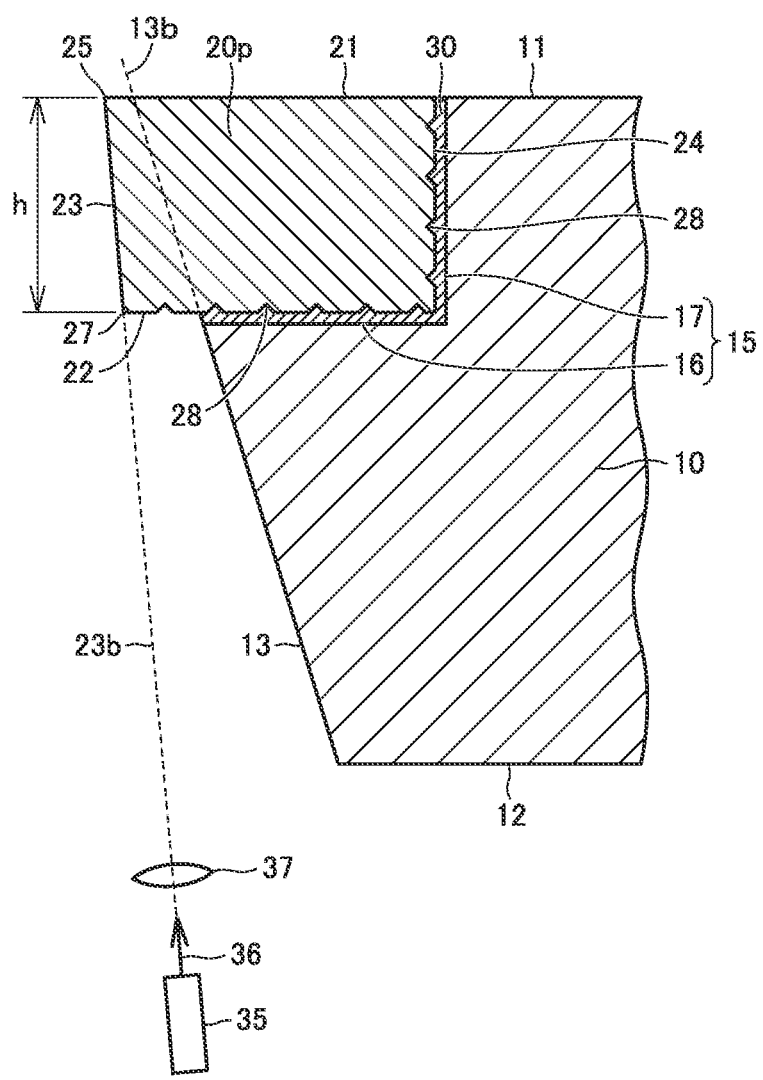
FIG. 8 is a partially enlarged cross-sectional view schematically illustrating one step in an example of the method for manufacturing the cutting tool according to the embodiment.

Referring to FIGS. 7 and 8, an example of a method for manufacturing cutting tool 1 according to the present embodiment will be described.

The method for manufacturing cutting tool 1 according to the present embodiment includes a step (S1) for preparing a sintered blade edge material 20p. Sintered blade edge material 20p has a configuration similar to the configuration of blade edge member 20, but is different from blade edge member 20 mainly in that cutting edge 25 is not formed in sintered blade edge material 20p. Therefore, sintered blade edge material 20p is a polycrystalline diamond (PCD) sintered material containing polycrystalline diamond and a binder. Sintered blade edge material 20p includes rake face 21, blade edge bottom face 22, flank face 23, and blade edge lateral face 24. A thickness h of sintered blade edge material 20p is greater than or equal to 0.3 mm.

Sintered blade edge material 20p is obtained as follows. A polycrystalline diamond layer is formed on a cemented carbide backing layer (not shown) to obtain a multilayer body of the backing layer and the polycrystalline diamond layer. The polycrystalline diamond layer contains, for example, diamond crystal powder and binder powder such as cobalt powder. The backing layer includes cemented carbide powder and binder powder such as cobalt powder. This multilayer body is sintered to obtain a multilayer sintered material of a backing plate that is a cemented carbide sintered material layer and a polycrystalline diamond sintered material layer. The backing plate is ground using a grindstone to remove the backing plate from the multilayer sintered material. Recessed structure 28 is formed on blade edge bottom face 22 by, for example, laser processing. A laser light source used for the laser processing is, for example, a Nd:YAG pulsed laser or a YVO$_4$ pulsed laser. Thus, sintered blade edge material 20p which is a polycrystalline diamond (PCD) sintered material containing polycrystalline diamond and a binder is obtained.

The method for manufacturing cutting tool 1 according to the present embodiment includes a step (S2) for fixing sintered blade edge material 20p to seat portion 15 of base metal 10 with brazing material 30. Brazing material 30 is disposed between blade edge bottom face 22 and seat bottom face 16, and is in contact with blade edge bottom face 22 and seat bottom face 16. Brazing material 30 may be further disposed between blade edge lateral face 24 and seat wall 17, and may be in contact with blade edge lateral face 24 and seat wall 17. At least a part of recessed structure 28 is filled with brazing material 30. Recessed structure 28 may be entirely filled with brazing material 30. Flank face 23 is located outside of base metal 10 with respect to lateral face 13 of base metal 10.

The method for manufacturing cutting tool 1 according to the present embodiment includes a step (S3) for holding base metal 10 with the holder. For example, a locking member (not shown) of the holder (not shown) is locked to through hole 19 of base metal 10. In this way, base metal 10 is held by the holder.

The method for manufacturing cutting tool 1 according to the present embodiment includes a step (S4) for forming cutting edge 25 by performing laser processing on flank face 23 of sintered blade edge material 20p.

Specifically, referring to FIG. 8, a laser light source 35 emits laser beam 36. Laser light source 35 is, for example, a Nd:YAG pulsed laser or a YVO$_4$ pulsed laser. Laser beam 36 has, for example, a laser wavelength of a Nd:YAG pulsed laser or a YVO$_4$ pulsed laser, a wavelength of a second harmonic (SHG) of the laser wavelength, or a wavelength of a third harmonic (THG) of the laser wavelength. Laser beam 36 is focused by a focusing optical system 37 including a lens. Laser beam 36 is applied along flank face 23 of sintered blade edge material 20p. Laser beam 36 may be applied to sintered blade edge material 20p from blade edge bottom face 22 side, or to sintered blade edge material 20p from rake face 21 side. Flank face 23 of sintered blade edge material 20p is processed by laser, whereby blade edge member 20 having cutting edge 25 is formed. Thus, cutting tool 1 is obtained.

A first laser irradiation condition during laser processing in step (S4) can be such that a laser wavelength is greater than or equal to 532 nm and less than or equal to 1064 nm, a laser spot diameter is greater than or equal to 5 μm and less than or equal to 70 μm as a half width, a laser focal depth is greater than or equal to 0.5 mm and less than or equal to 20 mm, a laser output is greater than or equal to 1 W and less than or equal to 20 W at a processing point, and a laser scan speed is greater than or equal to 5 mm/sec and less than or equal to 100 mm/sec.

First extension face 23b of flank face 23 extending from blade edge bottom face 22 toward bottom face 12 of base metal 10 is separated from lateral face 13 of base metal 10. Laser beam 36 for forming cutting edge 25 is applied to flank face 23 without being applied to base metal 10. Protrusion length t of flank face 23 is greater than or equal to 0.01 mm. Therefore, irradiation of base metal 10 with laser beam 36 for forming cutting edge 25 can be easily avoided.

The binder increases an absorption rate of the polycrystalline diamond sintered material with respect to laser beam 36 when cutting edge 25 is formed by laser processing. Therefore, cutting edge 25 can be easily formed by laser processing.

In step (S4), at least one of graphite or cobalt oxide may be generated on flank face 23 by laser processing of flank face 23. Specifically, in step (S4), a part of the polycrystalline diamond is converted into graphite due to laser processing of flank face 23. In this way, graphite is generated on flank face 23. In step (S4), a part of cobalt contained in the binder is converted into cobalt oxide due to laser processing of flank face 23. In this way, cobalt oxide is generated on flank face 23. When at least one of graphite or cobalt oxide is generated on flank face 23, sintered blade edge material 20p differs from blade edge member 20 in an amount of at least one of graphite or cobalt oxide on flank face 23.

Figure 12:
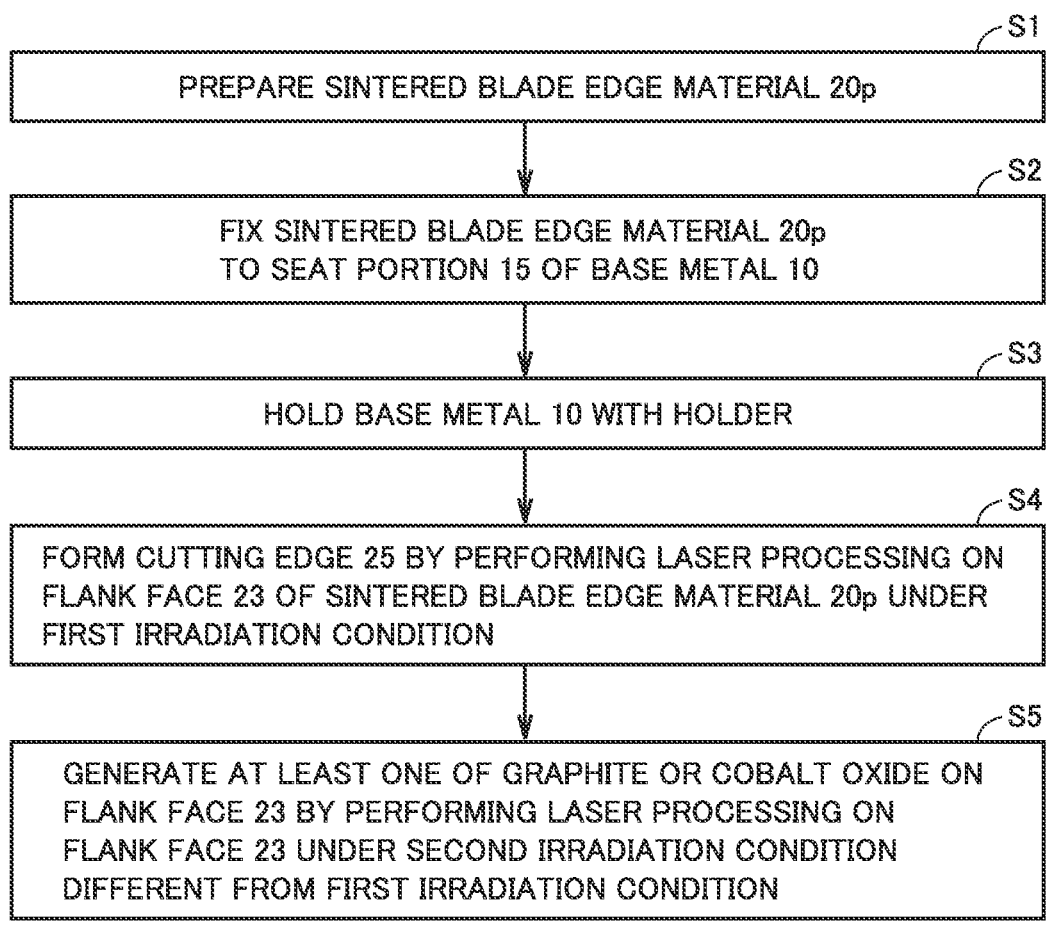
FIG. 12 is a diagram illustrating a flowchart of another example of the method for manufacturing the cutting tool according to the embodiment.

Referring to FIG. 12, another example of the method for manufacturing cutting tool 1 may further include a step (S5) for generating at least one of graphite or cobalt oxide on flank face 23 by performing laser processing on flank face 23 with laser beam 36 applied along flank face 23 under a second laser irradiation condition different from the first laser irradiation condition. In step (S5), a part of the polycrystalline diamond is converted into graphite due to laser processing of flank face 23. In this way, graphite is generated on flank face 23. In step (S5), a part of cobalt contained in the binder is converted into cobalt oxide due to laser processing of flank face 23. In this way, cobalt oxide is generated on flank face 23.

The amount of graphite produced on flank face 23 in step (S5) is larger than the amount of graphite produced on flank face 23 in step (S4). The amount of graphite produced on flank face 23 in step (S4) may be zero. The amount of cobalt oxide produced on flank face 23 in step (S5) is larger than the amount of cobalt oxide produced on flank face 23 in step (S4). The amount of cobalt oxide produced on flank face 23 in step (S4) may be zero.

Referring to FIG. 8, laser light source 35 emits laser beam 36 in step (S5). Laser light source 35 is, for example, a Nd:YAG pulsed laser or a $YVO_4$ pulsed laser. Laser beam 36 has, for example, a laser wavelength of a Nd:YAG pulsed laser or a $YVO_4$ pulsed laser, a wavelength of a second harmonic (SHG) of the laser wavelength, or a wavelength of a third harmonic (THG) of the laser wavelength. Laser beam 36 is focused by focusing optical system 37. Laser beam 36 is applied along flank face 23. Laser beam 36 may be applied to flank face 23 from blade edge bottom face 22 side, or to flank face 23 from rake face 21 side.

The ratio of graphite on flank face 23 that has been laser-processed in step (S5) is greater than or equal to 0.01 and less than or equal to 0.50. When the volume average diameter of the polycrystalline diamond is greater than or equal to 10 μm, excessive conversion of the polycrystalline diamond into graphite by laser processing can be prevented, and the ratio of graphite on flank face 23 can be less than or equal to 0.50. An excessive decrease in hardness of flank face 23 is prevented, and thus, the wear resistance of cutting tool 1 can be improved. On the other hand, when the volume average diameter of the polycrystalline diamond is less than 10 μm, the polycrystalline diamond is excessively converted into graphite by laser processing, so that the ratio of graphite on flank face 23 exceeds 0.50. The hardness of flank face 23 is excessively decreased, and thus, the wear resistance of the cutting tool is reduced.

For example, when the volume average diameter of the polycrystalline diamond was greater than or equal to 10 μm, the wear width of flank face 23 after 300 processing passes was 65 μm. On the other hand, when the volume average diameter of the polycrystalline diamond was greater than 1 μm and less than 10 μm, the wear width of flank face 23 after 300 processing passes was 77 μm. When the volume average diameter of the polycrystalline diamond was less than or equal to 1 μm, the wear width of flank face 23 after 300 processing passes was 83 μm.

The polycrystalline diamond sintered material contains cobalt oxide in an amount greater than or equal to 25 wt % on flank face 23 that has been laser-processed in step (S5). Therefore, the wear resistance of flank face 23 can be improved. The wear resistance of cutting tool 1 can be improved.

The second laser irradiation condition in step (S5) is different from the first laser irradiation condition in step (S4). An example of the second laser irradiation condition in step (S5) will be described below.

The light intensity distribution of laser beam 36 in step (S5) is gentler than the light intensity distribution of laser beam 36 in step (S4). The light intensity distribution of laser beam 36 means a light intensity distribution of laser beam 36 in a cross section perpendicular to the traveling direction of laser beam 36. For example, laser beam 36 in step (S5) is defocused with respect to laser beam 36 in step (S4). For example, the light intensity distribution of laser beam 36 in step (S5) can be made gentler than the light intensity distribution of laser beam 36 in step (S4) by changing the focal length of focusing optical system 37 between step (S4) and step (S5).

The second laser irradiation condition is such that a laser wavelength is greater than or equal to 532 nm and less than or equal to 1064 nm, a laser spot diameter is greater than or equal to 5 μm and less than or equal to 70 μm as a half width, a laser focal depth is greater than or equal to 1.0 mm, a laser output is greater than or equal to 1 W and less than or equal to 20 W at a processing point, and a laser scan speed is greater than or equal to 5 mm/sec and less than or equal to 100 mm/sec. The second laser irradiation condition is preferably such that the laser wavelength is 532 nm or 1064 nm, the laser spot diameter is 10 to 50 μm as a half width, the laser focal depth is greater than or equal to 1.5 mm, the laser output is 2 to 10 W, and the laser scan speed is 30 to 100 mm/min, for example.

The laser focal depth under the second laser irradiation condition is not particularly limited, but may be less than or equal to 20 mm. The laser pulse width is preferably greater than or equal to 1 fsec (femtosecond) and less than or equal to 1 microsecond. The laser repetition frequency is, for example, greater than or equal to 10 Hz and less than or equal to 1 MHz.

Figure 9:
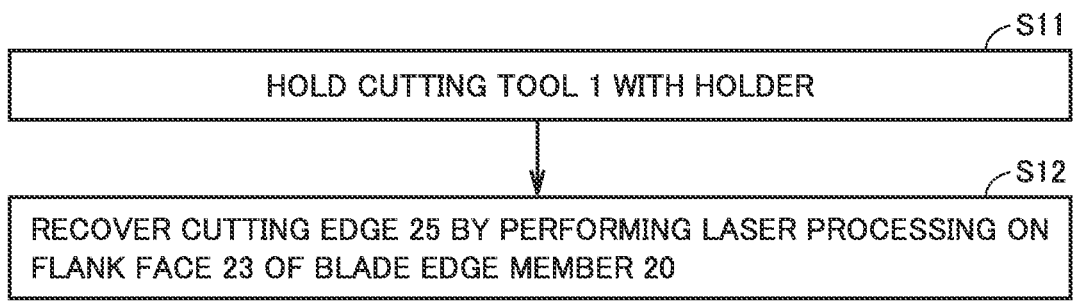
FIG. 9 is a flowchart illustrating an example of a method for recovering the cutting tool according to the embodiment.
Figure 10:
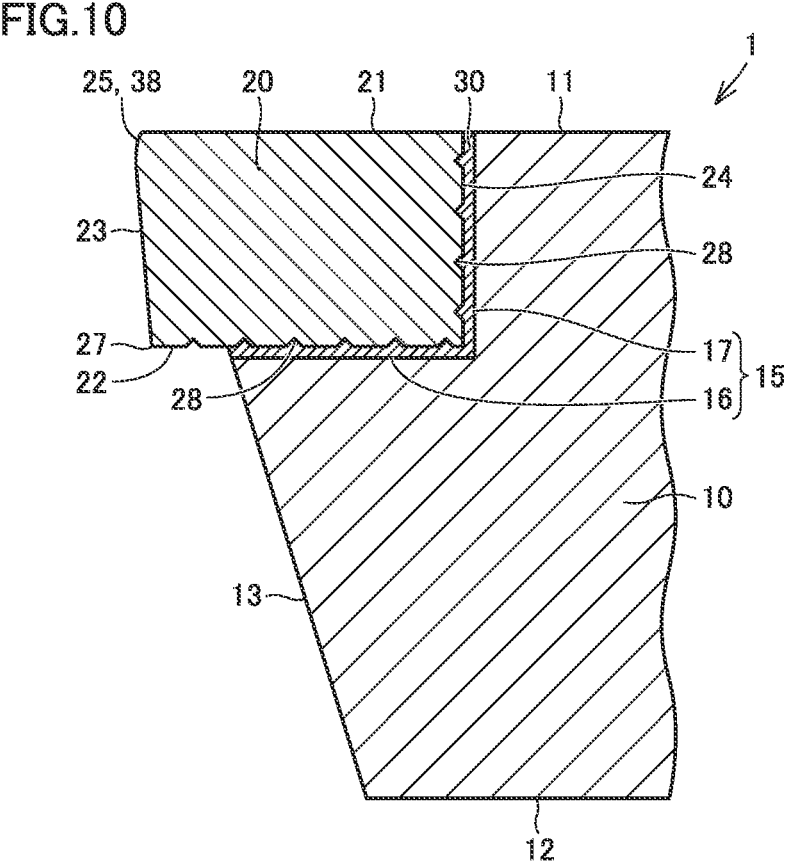
FIG. 10 is a partially enlarged cross-sectional view schematically illustrating the cutting tool according to the embodiment in which a blade edge member is chipped.
Figure 11:
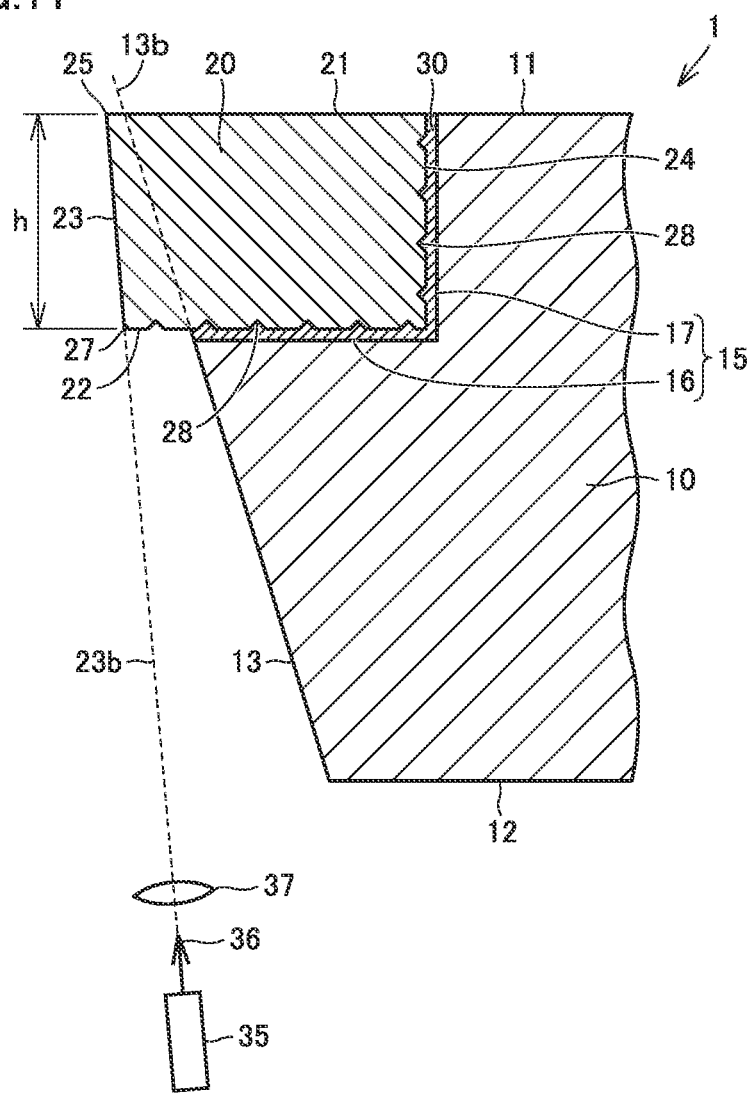
FIG. 11 is a partially enlarged cross-sectional view schematically illustrating one step of the method for recovering the cutting tool according to the embodiment.

Referring to FIGS. 9 to 11, an example of a method for recovering cutting tool 1 according to the present embodiment will be described.

The example of the method for recovering cutting tool 1 according to the present embodiment includes a step (S11) for holding cutting tool 1 with the holder. Referring to FIG. 10, a chip 38 may be generated in cutting edge 25 during cutting of a workpiece (not illustrated). Cutting tool 1 having chip 38 in cutting edge 25 is held by the holder. For example, base metal 10 of cutting tool 1 is held by the holder (not shown). Specifically, a locking member (not shown) of the holder (not shown) is locked to through hole 19 of base metal 10.

The example of the method for recovering cutting tool 1 according to the present embodiment includes a step (S12) for recovering cutting edge 25 by performing laser processing on flank face 23 of blade edge member 20. Referring to FIG. 11, laser beam 36 is applied along flank face 23 of blade edge member 20. Flank face 23 of blade edge member 20 is laser-processed, and chip 38 is removed. Laser beam 36 may be applied to blade edge member 20 from blade edge bottom face 22 side, or to blade edge member 20 from rake face 21 side. Thus, cutting edge 25 is recovered.

First extension face 23b of flank face 23 extending from blade edge bottom face 22 toward bottom face 12 of base metal 10 is separated from lateral face 13 of base metal 10. Laser beam 36 for recovering cutting edge 25 is applied to flank face 23 without being applied to base metal 10. Protrusion length t of flank face 23 is greater than or equal to 0.01 mm. Therefore, irradiation of base metal 10 with laser beam 36 for recovering cutting edge 25 can be easily avoided.

EXAMPLES

The present disclosure will be described in detail below with reference to Examples. Note that the present disclosure is not limited to Examples.

Cutting tools of sample Nos. 1 to 16 produced as described above were subjected to the following cutting test to evaluate the life of the cutting tools.

A workpiece having a cylindrical shape with a diameter of 100 mm and made of Al alloy (A390) is machined using each of the cutting tools. The cutting conditions are as follows. The cutting speed is 3000 mm/min. The feed speed is 5730 mm/min. The cutting depth (ap) is 0.50 mm. The number of processing passes is a maximum of 300. The number of processing passes from the start of cutting the workpiece using the cutting tool until the wear width of the flank face of the cutting tool reached 100 μm was defined as the life of the cutting tool. Note that, even when the wear width of the flank face of the cutting tool did not reach 100 µm when the number of processing passes reached 300, the life of the cutting tool was determined as 300.

The cutting tools of sample Nos. 1 to 13 are Examples of the present embodiment. On the other hand, the cutting tools of sample Nos. 14 to 16 are comparative examples.

Specifically, the thickness of the blade edge member of each of the cutting tools of sample No. 14 and sample No. 15 is 1.0 mm which is the same as the thickness of the blade edge member of each of the cutting tools of sample No. 1 and sample No. 8 to sample No. 13. However, the blade edge member of each of the cutting tools of sample Nos. 14 and 15 is a multilayer body of a polycrystalline diamond sintered material layer and a backing plate which is a cemented carbide sintered material layer. The polycrystalline diamond sintered material layer has a thickness of 0.5 mm, and the backing plate also has a thickness of 0.5 mm. In the cutting tool of sample No. 14, the cutting edge is formed by grinding the flank face of the blade edge member using a grindstone. The cutting tool of sample No. 16 has a configuration similar to the configuration of the cutting tool of sample No. 1, but is different from the cutting tool of sample No. 1 in that the blade edge member has a smaller thickness than that of the cutting tool of sample No. 1. The results of the cutting test are shown in Table 1.

form a cutting edge in the cutting tool of sample No. 15, it is necessary to perform laser processing on the backing plate which is a cemented carbide sintered material layer in addition to the polycrystalline diamond sintered material layer. The time required for laser processing increases, and more heat is generated in the blade edge member. For this reason, it is considered that, in the cutting tool of sample No. 15, the brazing material is melted when the cutting edge is formed by laser processing. As a result, in the cutting tool of sample No. 15, the fixing strength of the blade edge member to the base metal decreases, and the blade edge member falls off from the base metal with a smaller number of processing passes. For the above reasons, the life of the cutting tool of sample No. 15 is shorter than the life of the cutting tools of sample Nos. 1 to 13.

The life of the cutting tool of sample No. 16 is shorter than the life of the cutting tools of sample Nos. 1 to 13. Heat is generated in a cutting edge when a workpiece is cut using a cutting tool. The thickness of the blade edge member of the cutting tool of sample No. 16 is smaller than the thickness of the blade edge member of each of the cutting tools of sample Nos. 1 to 13. The distance between the cutting edge and the brazing material in the cutting tool of sample No. 16 is shorter than the distance between the cutting edge and the brazing material in each of the cutting tools of sample Nos.

TABLE 1

| Sample No. | Backing plate | Method for forming cutting edge | Thickness h of blade edge member (mm) | Protrusion length t (mm) | Life (Number of processing passes) |
|---|---|---|---|---|---|
| 1 | Not provided | Laser processing | 1.0 | 0.05 | 300 |
| 2 | Not provided | Laser processing | 0.3 | 0.05 | 300 |
| 3 | Not provided | Laser processing | 0.4 | 0.05 | 300 |
| 4 | Not provided | Laser processing | 0.5 | 0.05 | 300 |
| 5 | Not provided | Laser processing | 1.5 | 0.05 | 300 |
| 6 | Not provided | Laser processing | 2.0 | 0.05 | 300 |
| 7 | Not provided | Laser processing | 2.5 | 0.05 | 300 |
| 8 | Not provided | Laser processing | 1.0 | 0.01 | 300 |
| 9 | Not provided | Laser processing | 1.0 | 0.10 | 300 |
| 10 | Not provided | Laser processing | 1.0 | 0.20 | 300 |
| 11 | Not provided | Laser processing | 1.0 | 0.30 | 300 |
| 12 | Not provided | Laser processing | 1.0 | 0.40 | 300 |
| 13 | Not provided | Laser processing | 1.0 | 0.50 | 300 |
| 14 | Provided | Grinding using grindstone | 1.0 (PCD 0.5 mm, backing plate 0.5 mm) | 0.05 | 300 |
| 15 | Provided | Laser processing | 1.0 (PCD 0.5 mm, backing plate 0.5 mm) | 0.05 | Less than 50 |
| 16 | Not provided | Laser processing | 0.2 | 0.05 | Less than 50 |

From the results of the cutting test shown in Table 1, the cutting tools of sample Nos. 1 to 13 have a long life as the cutting tool of sample No. 14.

On the other hand, the life of the cutting tool of sample No. 15 is shorter than the life of the cutting tools of sample Nos. 1 to 13. In the cutting tool of sample No. 15, it was confirmed that the brazing material was melted when the cutting edge was formed by laser processing. In order to 1 to 13. Due to the influence of heat, the brazing material of the cutting tool of sample No. 16 is more likely to melt than the brazing material of each of the cutting tools of sample No. 1 to sample No. 13. For this reason, the life of the cutting tool of sample No. 16 is shorter than the life of the cutting tools of sample Nos. 1 to 13.

It should be understood that the embodiment and examples disclosed herein are illustrative and non-restrictive in every respect. The scope of the present disclosure is defined not by the above embodiment but by the claims, and is intended to include meanings equivalent to the claims and all modifications within the scope.

REFERENCE SIGNS LIST

1: cutting tool, 10: base metal, 11: top face, 12: bottom face, 13: lateral face, 13b: second extension face, 13c: perpendicular, 15: seat portion, 16: seat bottom face, 17: seat wall, 19: through hole, 20: blade edge member, 20p: sintered blade edge material, 21: rake face, 22: blade edge bottom face, 23: flank face, 23b: first extension face, 24: blade edge lateral face, 25: cutting edge, 27: ridge line, 28: recessed structure, 30: brazing material, 35: laser light source, 36: laser beam, 37: focusing optical system, 38: chip

The invention claimed is:

1. A cutting tool comprising:
a base metal provided with a seat portion;
a blade edge member that is a polycrystalline diamond sintered material containing polycrystalline diamond and a binder; and
a brazing material that fixes the blade edge member to the seat portion of the base metal,
wherein the base metal includes a top face, a bottom face, and a lateral face that is contiguous to the top face and the bottom face,
the seat portion includes a seat bottom face and a seat wall,
the seat bottom face is set back from the top face toward the bottom face and is contiguous to the lateral face,
the seat wall is contiguous to the top face, the seat bottom face, and the lateral face,
the blade edge member includes a rake face extending along the top face, a blade edge bottom face on a side opposite to the rake face, a flank face contiguous to the rake face and the blade edge bottom face, and a cutting edge formed between the rake face and the flank face,
the blade edge member has a thickness of greater than or equal to 0.3 mm,
the brazing material is disposed between the blade edge bottom face and the seat bottom face and is in contact with the blade edge bottom face and the seat bottom face,
the flank face is located outside of the base metal with respect to the lateral face of the base metal,
the polycrystalline diamond sintered material contains graphite and cobalt oxide on the flank face,
wherein the blade edge member is configured such that, when Raman spectroscopy is performed on the flank face, with carbon constituting the polycrystalline diamond being defined as first carbon and carbon constituting the graphite being defined as second carbon, a ratio of a second peak intensity of the second carbon on the flank face to a sum of a first peak intensity of the first carbon on the flank face and the second peak intensity is greater than or equal to 0.01 and less than or equal to 0.50,
the polycrystalline diamond has a volume average diameter of greater than or equal to 10 μm, and
the polycrystalline diamond sintered material contains the cobalt oxide in an amount greater than or equal to 25 wt % on the flank face.

2. The cutting tool according to claim 1, wherein a first extension face of the flank face from the blade edge bottom face to a side of the bottom face of the base metal is separated from the lateral face of the base metal.

3. The cutting tool according to claim 2, wherein
at least one of the blade edge bottom face or the seat bottom face is formed with a recessed structure, and
at least a part of the recessed structure is filled with the brazing material.

4. The cutting tool according to claim 3, wherein a protrusion length of the flank face from the lateral face is greater than or equal to 0.01 mm.

5. The cutting tool according to claim 4, wherein the protrusion length of the flank face is less than or equal to 0.50 mm.

6. The cutting tool according to claim 3, wherein the thickness of the blade edge member is less than or equal to 2.0 mm.

7. The cutting tool according to claim 2, wherein a protrusion length of the flank face from the lateral face is greater than or equal to 0.01 mm.

8. The cutting tool according to claim 7, wherein the protrusion length of the flank face is less than or equal to 0.50 mm.

9. The cutting tool according to claim 2, wherein the thickness of the blade edge member is less than or equal to 2.0 mm.

10. The cutting tool according to claim 1, wherein
at least one of the blade edge bottom face or the seat bottom face is formed with a recessed structure, and
at least a part of the recessed structure is filled with the brazing material.

11. The cutting tool according to claim 10, wherein a protrusion length of the flank face from the lateral face is greater than or equal to 0.01 mm.

12. The cutting tool according to claim 11, wherein the protrusion length of the flank face is less than or equal to 0.50 mm.

13. The cutting tool according to claim 10, wherein the thickness of the blade edge member is less than or equal to 2.0 mm.

14. The cutting tool according to claim 1, wherein a protrusion length of the flank face from the lateral face is greater than or equal to 0.01 mm.

15. The cutting tool according to claim 14, wherein the protrusion length of the flank face is less than or equal to 0.50 mm.

16. The cutting tool according to claim 1, wherein the thickness of the blade edge member is less than or equal to 2.0 mm.

17. A method for manufacturing the cutting tool of claim 1, the method comprising:
fixing a sintered blade edge material to the seat portion of the base metal with the brazing material, the sintered blade edge material being the polycrystalline diamond sintered material that contains the polycrystalline diamond and the binder, and including the rake face, the blade edge bottom face, and the flank face;
forming the cutting edge by performing laser processing on the flank face of the sintered blade edge material with a laser beam applied along the flank face of the sintered blade edge material under a first laser irradiation condition; and
generating at least one of the graphite or the cobalt oxide on the flank face by performing laser processing on the flank face with the laser beam applied along the flank face under a second laser irradiation condition different from the first laser irradiation condition.

* * * * *